(12) United States Patent
Fu et al.

(10) Patent No.: US 12,073,527 B2
(45) Date of Patent: Aug. 27, 2024

(54) THREE-DIMENSIONAL (3D) HUMAN MODELING UNDER SPECIFIC BODY-FITTING OF CLOTHES

(71) Applicant: SONY GROUP CORPORATION, Tokyo (JP)

(72) Inventors: Chen Fu, San Jose, CA (US); Mohammad Gharavi-Alkhansari, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 700 days.

(21) Appl. No.: 17/183,737

(22) Filed: Feb. 24, 2021

(65) Prior Publication Data

US 2022/0270337 A1   Aug. 25, 2022

(51) Int. Cl.
*G06T 19/20* (2011.01)
*G06T 7/70* (2017.01)
*G06V 40/16* (2022.01)

(52) U.S. Cl.
CPC ............. *G06T 19/20* (2013.01); *G06T 7/70* (2017.01); *G06V 40/161* (2022.01); *G06V 40/168* (2022.01); *G06T 2210/16* (2013.01); *G06T 2219/2004* (2013.01); *G06T 2219/2021* (2013.01)

(58) Field of Classification Search
CPC ....... G06T 19/20; G06T 7/70; G06T 2210/16; G06T 2219/2004; G06T 2219/2021; G06V 40/161; G06V 40/168
See application file for complete search history.

(56) References Cited

U.S. PATENT DOCUMENTS 9,524,582 B2   12/2016  Ma et al.
10,699,108 B1 *  6/2020  Hansen ............... G06V 40/103
(Continued)

FOREIGN PATENT DOCUMENTS

CA    2654960 A1 * 12/2008 ............ G06T 13/40
CN  106952335 B    1/2020

OTHER PUBLICATIONS

Mahmoodi, et al., "A Comprehensive Survey on Human Skin Detection", International Journal of Image, Graphics and Signal Processing, vol. 8, No. 5, May 2016, 35 pages.

(Continued)

*Primary Examiner* — Qun Shen
(74) *Attorney, Agent, or Firm* — CHIP LAW GROUP

(57) ABSTRACT

An electronic device and method for 3D human modeling under a specific body-fitting of clothes is disclosed. A set of depth images of a person wearing clothes is acquired and an initial body model is generated based on a first shape-fitting of a human body prior with at least a first depth scan. A posed-body model is obtained based on a pose-fitting of the initial body model with at least one depth scan. In each depth scan, clothed scan points and unclothed scan points are determined. A final body model is determined based on a second shape-fitting of vertices which belong to the posed-body model and correspond to an under-cloth skin portion of the body of the person. The second shape-fitting is based on the clothed scan points and the unclothed scan points. The final body model is textured based on a skin texture map for the body.

18 Claims, 6 Drawing Sheets

(56) References Cited

U.S. PATENT DOCUMENTS

| | | | |
|---|---|---|---|
| 2007/0273711 A1* | 11/2007 | Maffei | G06T 17/20 345/639 |
| 2016/0203361 A1 | 7/2016 | Black | |
| 2016/0210602 A1* | 7/2016 | Siddique | G06Q 20/047 |
| 2018/0293788 A1* | 10/2018 | Black | G06Q 30/0601 |
| 2019/0340774 A1* | 11/2019 | Patwardhan | H04N 23/56 |
| 2020/0098177 A1 | 3/2020 | Ni et al. | |
| 2021/0049811 A1* | 2/2021 | Fedyukov | G06T 7/60 |
| 2021/0088811 A1* | 3/2021 | Varady | G02C 13/005 |
| 2021/0398337 A1* | 12/2021 | McDuff | G06T 13/40 |

OTHER PUBLICATIONS

Alldieck, et al., "Learning to Reconstruct People in Clothing from a Single RGB Camera", Computer Vision and Pattern Recognition, Apr. 9, 2019, 12 pages.

Cao, et al., "Realtime Multi-Person 2D Pose Estimation using Part Affinity Fields", Computer Vision and Pattern Recognition, Apr. 14, 2017, 09 pages.

Loper, et al., "SMPL: A skinned multi-person linear model", ACM Transactions on Graphics, vol. 34, No. 6, Oct. 2015, 16 pages.

Anguelov, et al., "SCAPE: Shape Completion and Animation of People", ACM Transactions on Graphics, vol. 24, No. 3, Jul. 2005, pp. 408-416.

Zhang, et al., "Iterative point matching for registration of free-form curves and surfaces", International Journal of Computer Vision vol. 13, No. 12, 1994, pp. 119-152.

Balan Alexandru O et al: "The Naked Truth: Estimating Body Shape Under Clothing", 2020, Computer Vision—ECCV 2020 : 16th European Conference, Glasgow, UK, Aug. 23-28, 2020: Proceedings; [Lecture Note in Computer Science; ISSN 0302-9743], XP047530094, ISBN: 978-3-030-58594-5 pp. 15-29, section 4 Shape Constancy section 5 Clothing.

Bogo Federica et al: "Detailed Full-Body Reconstructions of Moving People from Monocular RGB-D Sequences", 2015 IEEE International Conference on Computer Vision (ICCV), IEEE, Dec. 7, 2015 (Dec. 7, 2015), pp. 2300-2308, XP032866570, DOI: 10.1109/ICCV.2015.265 [retrieved on Feb. 17, 2016], section 4. Method.

Cao Zhe et al: "OpenPose: Realtime Multi-Person 2D Pose Estimation Using Part Affinity Fields", IEEE Transactions on Pattern Analysis and Machine Intelligence, IEEE Computer Society, USA, vol. 43, No. 1, Jul. 17, 2019 (Jul. 17, 2019), pp. 172-186, XP011824613, ISSN: 0162-8828, DOI: 10.1109/TPAMI.2019.2929257, [retrieved on Dec. 3, 2020] abstract.

Hasler N et al: "Estimating body shape of dressed humans", Computers and Graphics, Elsevier, GB, vol. 33, No. 3, Jun. 2009 (Jun. 2009), pp. 211-216, XP026448475, ISSN: 0097-8493 [retrieved on Mar. 26, 2009] section 3. Fitting.

Zhang Chao et al: "Detailed, Accurate, Human Shape Estimation from Clothed 3D Scan Sequences", 2017 IEEE Conference on Computer Vision and Pattern Recognition (CVPR), IEEE Computer Society, US, Jul. 21, 2017 (Jul. 21, 2017), pp. 5484-5493, XP033249908, ISSN: 1063-6919, DOI: 10.1109/CVPR.2017.582 [retrieved on Nov. 6, 2017] section 4. Method.

\* cited by examiner

THREE-DIMENSIONAL (3D) HUMAN MODELING UNDER SPECIFIC BODY-FITTING OF CLOTHES

CROSS-REFERENCE TO RELATED APPLICATIONS/INCORPORATION BY REFERENCE

None.

FIELD

Various embodiments of the disclosure relate to three-dimensional (3D) human modeling. More specifically, various embodiments of the disclosure relate to an electronic device and method for 3D human modeling under a specific body-fitting of clothes.

BACKGROUND

Advancements in the field of three-dimensional (3D) computer graphics have provided the ability to create 3D models and visualize real objects in a 3D environment. 3D content, such as a 3D character model, is used in animated movies, games, and virtual-reality systems to enhance user experience. A 3D model is a static 3D mesh that resembles the shape of a particular object. For example, a 3D human body model may emulate a shape and pose of a person in a certain scene. Example application areas of 3D human body modeling may include, but are not limited to, telepresence, virtual try-on, and virtual space sharing.

Typically, for the generation of a 3D human body model, body of the person wearing clothes may be scanned through a multi-camera system. Such a system may be expensive, space consuming, and difficult to implement in a non-studio setting. Also, the generation of the 3D human body model may have increased computational complexity when the scanned body of the person includes clothes, especially loose or semi-tight clothes. In case the person wears tight clothes (for example, clothes which are skin-fit), the generation of the 3D human body model may be relatively easier as compared to a case where the person wears loose or semi-tight clothes.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for three-dimensional (3D) human modeling under a specific body-fitting of clothes is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
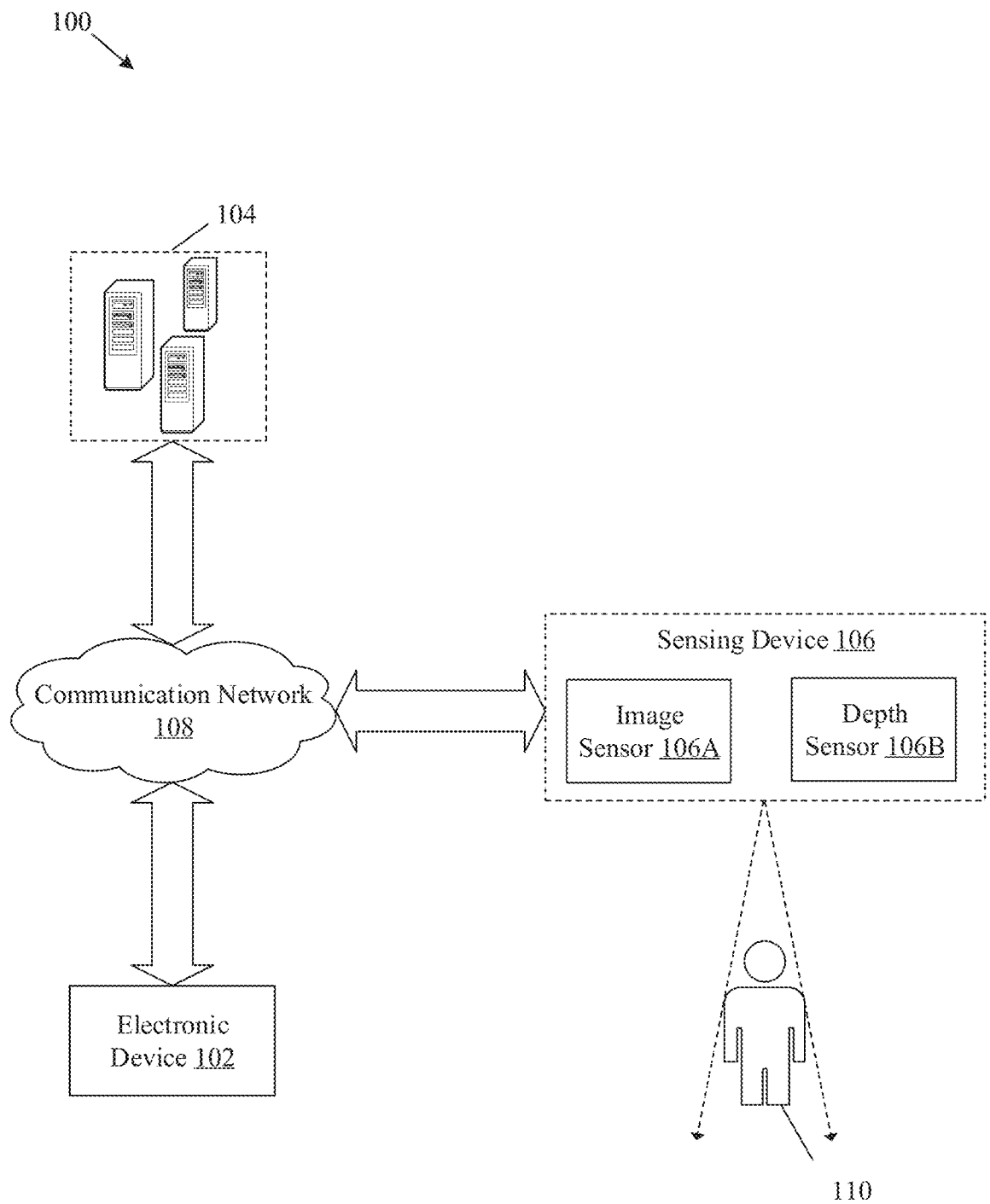
FIG. 1 is a block diagram that illustrates an exemplary network environment for three-dimensional (3D) human modeling under a specific body-fitting of clothes, in accordance with an embodiment of the disclosure.

The following described implementations may be found in the disclosed electronic device and method for three-dimensional (3D) human modeling under a specific body-fitting of clothes. Exemplary aspects of the disclosure may include the electronic device that may be communicatively coupled to a sensing device. The sensing device may include an image sensor and a depth sensor, for example. The image sensor may capture a set of color images of a person wearing clothes. The depth sensor may capture a set of depth images corresponding to the set of color images. Each color image and corresponding depth image may be captured from a particular viewpoint. The electronic device may receive the set of color images and the set of depth images from the sensing device. Based on the received images, the electronic device may acquire a set of depth scans of the person wearing the clothes. Each depth scan may be acquired by a back-projection of a corresponding depth image to 3D space. The back-projection may be based on intrinsic parameters of an imaging device (e.g., the sensing device) that captures the set of color images and the set of depth images.

The electronic device may generate an initial body model of the person based on first shape-fitting of a human body prior with at least a first depth scan of the acquired set of depth scans. After initial shape-fitting, the electronic device may obtain a posed-body model based on a pose-fitting of the generated initial body model with at least one depth scan of the acquired set of depth scans. The electronic device may determine clothed scan points and unclothed scan points in each of the acquired set of depth scans and may generate a final body model of the person based on a second shape-fitting of vertices which may belong to the posed-body model and correspond to an under-cloth skin portion of the body of the person. The second shape-fitting may be based on the determined clothed scan points and the determined unclothed scan points. After the final body model is generated, the electronic device may texture the generated final body model based on a skin texture map for the body of the person.

The disclosed technique for 3D human body modeling requires a single sensing device including one image sensor and one depth sensor. The sensing device may be relatively inexpensive and may require lesser space as compared to conventional multicamera systems typically used for 3D human body modeling. Also, the sensing device can be implemented in a non-studio setting, unlike the conventional multicamera systems which may require a studio setting.

Many conventional 3D body modeling methods only precisely model a person wearing tight clothes (or gym clothes). This limits the usefulness of such methods for more common situations where people wear relatively loose clothes. The present disclosure provides a system and method for 3D human body modeling under a specific body-fitting, such as semi-tight fitting of clothes. When modeling human body for situations where the person wears tight clothes, it is relatively easier to model the body shape under clothes as compared to situations where the body shape under loose or semi-tight clothes needs to be modeled. The disclosure includes a method to determine the clothed scan points and the unclothed scan points in each of the set of depth scans. The under-cloth skin portion of the body of the person may be determined based on the determined clothed scan points and the unclothed scan points. By determining the under-cloth skin portion of the body, an accurate 3D human body model (with a correct under-cloth body shape) may be generated, even in cases where the scanned body wears semi-tight clothes.

FIG. 1 is a block diagram that illustrates an exemplary network environment for three-dimensional (3D) human modeling under a specific body-fitting of clothes, in accordance with an embodiment of the disclosure. With reference to FIG. 1, there is shown a network environment 100. The network environment 100 may include an electronic device 102, a server 104, a sensing device 106, and a communication network 108. There is further shown a person 110 who may be associated with the electronic device 102. The sensing device 106 may include an image sensor 106A and a depth sensor 106B. The electronic device 102 may be communicatively coupled to the server 104 and the sensing device 106, via the communication network 108.

In FIG. 1, the server 104 and the sensing device 106 are shown as two entities which are separate from the electronic device 102. In some embodiments, some or all of the functionalities of the server 104 and/or the sensing device 106 may be incorporated in the electronic device 102, without departing from the scope of the present disclosure.

The electronic device 102 may include suitable logic, circuitry, interfaces, and/or code that may be configured to generate a 3D human body model of a person (e.g., the person 110). While modeling the body of the person, both unclothed and under-cloth body shape may be estimated. The accurate estimation of the under-cloth body shape may be required, especially when the person wears clothes of a first type of body-fitting, for example, a semi-tight fitting. The first type of body-fitting which may imply that the measurement of the clothes may be greater than a corresponding measurement of the body by a first threshold. Examples of the electronic device 102 may include, but are not limited to, a computing device, a telepresence system, a virtual try-on system, a virtual space-sharing system, a video-conferencing system, an eXtended reality (XR)-based device, a gaming device, a smartphone, a desktop computer, a digital signage, a camera, a mainframe machine, a server, a computer work-station, and/or a consumer electronic (CE) device.

The server 104 may include suitable circuitry, interfaces, and/or code that may be configured to store a three-dimensional (3D) human body prior and/or information related to 3D body modeling. For example, the information may include 3D scans or Red-Green-Blue-Depth (RGB-D) data to be used for the 3D body modeling. Examples of the server 104 may include, but are not limited to, an application server, a cloud server, a web server, a database server, a file server, a gaming server, a mainframe server, or a combination thereof.

The sensing device 106 may include suitable logic, circuitry, interfaces, and/or code that may be configured to capture a set of color images of a body of the person 110 and a set of depth images corresponding to the set of color images. The sensing device 106 may be configured to transmit the captured set of color images and the set of depth images to the electronic device 102 directly via an I/O interface or via the communication network 108. The sensing device 106 may include a plurality of sensors, such as a combination of a depth sensor, a color sensor, (such as a red-green-blue (RGB) sensor), and/or an infrared (IR) sensor that may capture the body of the person 110 from a particular viewpoint. Example implementations of the sensing device 106 may include, but are not limited to, a depth sensor, a Light Detection and Ranging (LiDAR), a Time-of-Flight (ToF) sensor, a sensor which implements Structure-from-motion (SfM), an IR sensor, an image sensor, a structured-light 3D scanner, a hand-held laser scanner, a modulated light 3D scanner, a stereoscopic camera, a camera array, and/or a combination thereof. In one embodiment, the sensing device 106 may be included as a component of the electronic device 102.

The image sensor 106A may include suitable logic, circuitry, and interfaces that may be configured to capture the set of color images of the body of the person 110 from multiple viewpoints such that a panoramic scan of the person 110 may be captured. Examples of the image sensor 106A may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The depth sensor 106B may include suitable logic, circuitry, and interfaces that may be configured to capture the set of depth images associated with the body of the person 110. The set of depth images may correspond to the set of color images of the body of the person 110. Examples of the depth sensor 106B may include, but are not limited to, a stereo camera-based sensor, a ToF depth sensor, a Light Detection And Ranging (LiDAR)-based depth sensor, a Radio Detection And Ranging (RADAR)-based depth sensor, an ultrasonic depth sensor, and/or other depth/proximity sensors.

The communication network 108 may include a communication medium through which the electronic device 102 may be communicatively coupled to the server 104 and the sensing device 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, $4^{th}$ Generation or $5^{th}$ Generation (5G) mobile network (i.e. 5G New Radio)). Various devices of the network environment 100 may be configured to connect to the communication network 108, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the sensing device 106 may be configured to capture a set of color images of a body of the person 110 and a set of depth images corresponding to the set of color images from a set of viewpoints. For example, the image sensor 106A may capture a set of RGB color images of the body of the person 110 and the depth sensor 106B may capture the set of depth images corresponding to the set of RGB color images of the body. Each RGB color image and the corresponding depth image may be captured from a particular viewpoint and the set of RGB color images and the corresponding set of depth images may together cover an entire body (such as 360 degrees scan or 270 degrees scan) of the person 110. Alternatively, instead of covering the entire body, the body modeling may be possible with a frontal view only (i.e. RGB and depth from a single frontal view), as a human body prior is already present. With the frontal view, the modeling accuracy may be slightly sacrificed in comparison to a 360 degree scan. The sensing process (i.e. the capture or acquisition of color and depth images) may include an RGB and depth video sequence or a single frame capture (which is depth and RGB together) of the frontal view. The set of RGB color image and the corresponding depth images may be also referred to as RGB-Depth (RGBD) data.

The sensing device 106 may be configured to transmit the captured set of color images and the set of depth images to the electronic device 102, via the communication network 108. The electronic device 102 may receive the set of color images of the body of the person 110 and the set of depth images from the sensing device 106. Once received, the electronic device 102 may be configured to acquire a set of depth scans of the person 110. Each depth scan of the set of depth scans may be a 3D scan that may be acquired by a back-projection of a corresponding depth image of the received set of depth images to 3D space. The back-projection may be based on intrinsic parameters of an imaging device (e.g., the sensing device 106) that captures the set of color images and the set of depth images. The person 110 may wear clothes that correspond to a first type of body-fitting (for example, a semi-tight fitting). The first type of body-fitting may imply that a measurement of the clothes may be greater than a corresponding measurement of the body by a first threshold, for example, 2-3 inches. For example, if the chest measurement of the person 110 is 39 inches and the first threshold is 3 inches, T-shirts having a chest size of at least 42 inches may correspond to the first type of body-fitting for the person 110.

The electronic device 102 may be configured to generate an initial body model of the person 110 based on a first shape-fitting of a human body prior with at least a first depth scan of the acquired set of depth scans. In an embodiment, for the generation of the initial body model, an initial human body shape may be estimated by directly fitting the human body prior to the surface of the first depth or 3D scan.

After the first shape-fitting is done, the electronic device 102 may be configured to obtain a posed-body model based on a pose-fitting of the generated initial body model with at least one depth scan of the acquired set of depth scans. In an embodiment, after the initial body shape (i.e. initial shape parameters associated with the initial body model) is obtained, pose parameters may be estimated by minimizing a distance between the posed-body model and a depth scan (i.e. 3D scan). Based on the pose parameters and the initial shape parameters, the posed-body model may be obtained.

The electronic device 102 may be further configured to determine clothed scan points and unclothed scan points (also referred to as skin scan points) in each of the acquired set of depth scans. For each scan, the clothed scan points and unclothed scan points may be determined for under-clothe body modeling, where skin exposed 3D scan points (i.e. skin scan points) provide important information on the exact body shape and clothed scan points provide the outer bound of the body shape. In an embodiment, for the determination of the clothed scan points and skin scan points, the electronic device may execute a per-frame skin detection on the RGBD data and per-frame skin detection results (i.e. clothed and skin scan points) are merged to obtain a global skin vertices labeling on the posed-body model.

The electronic device 102 may be configured to generate a final body model of the person 110 based on a second shape-fitting of vertices which may belong to the posed-body model and correspond to an under-cloth skin portion of the body of the person 110. The second shape-fitting may be based on the determined clothed scan points and the determined unclothed scan points. After the final body model is generated, the electronic device 102 may be configured to texture the generated final body model based on a skin texture map for the body of the person 110 to generate a textured 3D human body model of the person 110. Various operations of the electronic device 102 for the 3D human modeling are described further, for example, in FIGS. 3A, 3B, and 4.

Figure 2:
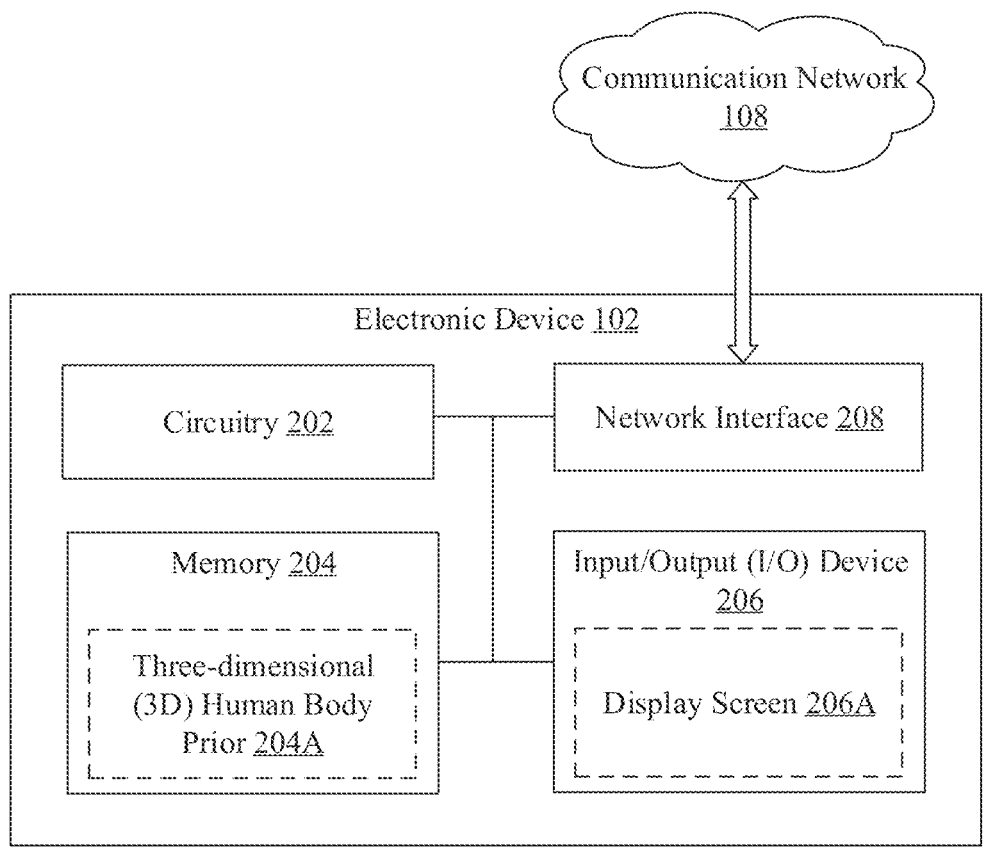
FIG. 2 is a block diagram that illustrates an exemplary electronic device for three-dimensional (3D) human modeling under a specific body-fitting of clothes, in accordance with an embodiment of the disclosure.

FIG. 2 is a block diagram that illustrates an exemplary electronic device for three-dimensional (3D) human modeling under a specific body-fitting of clothes, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The memory 204 may store a human body prior 204A. The I/O device 206 may include a display screen 206A. The circuitry 202 may be communicatively coupled to the memory 204, the I/O device 206, and the network interface 208. The circuitry 202 may be configured to communicate with the server 104 and the sensing device 106 by use of the network interface 208.

The circuitry 202 may include suitable logic, circuitry, and interfaces that may be configured to execute program instructions associated with different operations to be executed by the electronic device 102. The circuitry 202 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

The memory 204 may include suitable logic, circuitry, and/or interfaces that may be configured to store the program instructions executable by the circuitry 202. The memory 204 may be configured to store operating systems and associated applications. In accordance with an embodiment, the memory 204 may be also configured to store the 3D human body prior 204A. In addition, the memory 204 may also store the received set of color images, the received set of depth images, and acquired set of depth scans. Further, the memory 204 may store the initial body model, the posed-body model, information related to the determined clothed scan points and unclothed scan points, the final body model, and the skin texture map of the body of the person 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input from a user. The I/O device 206 may be further configured to provide an output to the user. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display screen 206A and/or a speaker.

The display screen 206A may include suitable logic, circuitry, interfaces, and/or code that may be configured to render an application interface to display the textured 3D human body model generated by the circuitry 202. In accordance with an embodiment, the display screen 206A may be a touch screen, where input from the person 110 may be received via the application interface. The display screen 206A may capture the input from the user. The user may be able to provide inputs with the help of a plurality of buttons or UI elements displayed on the touch screen. The touch screen may correspond to at least one of a resistive touch screen, a capacitive touch screen, or a thermal touch screen. In accordance with an embodiment, the display screen 206A may receive the input through a virtual keypad, a stylus, a gesture-based input, and/or a touch-based input. The display screen 206A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 206A may refer to a display screen of smart-glass device, a see-through display, a projection-based display, an electro-chromic display, and/or a transparent display.

The network interface 208 may include suitable logic, circuitry, code, and/or interfaces that may be configured to facilitate communication between the circuitry 202, the server 104, and the sensing device 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a $5^{th}$ generation network (such as 5G new radio (NR) network or a 5G smart antenna), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 208 may be capable to communicate with a 5G communication network and will include appropriate 5G support functionality such as, but not limited to, a 5G NR, a V2X Infrastructure, and a 5G Smart Antenna. Various operations of the circuitry 202 for 3D human modeling under specific body-fitting are described further, for example, in FIGS. 3A, 3B, and 4.

Figure 3A:
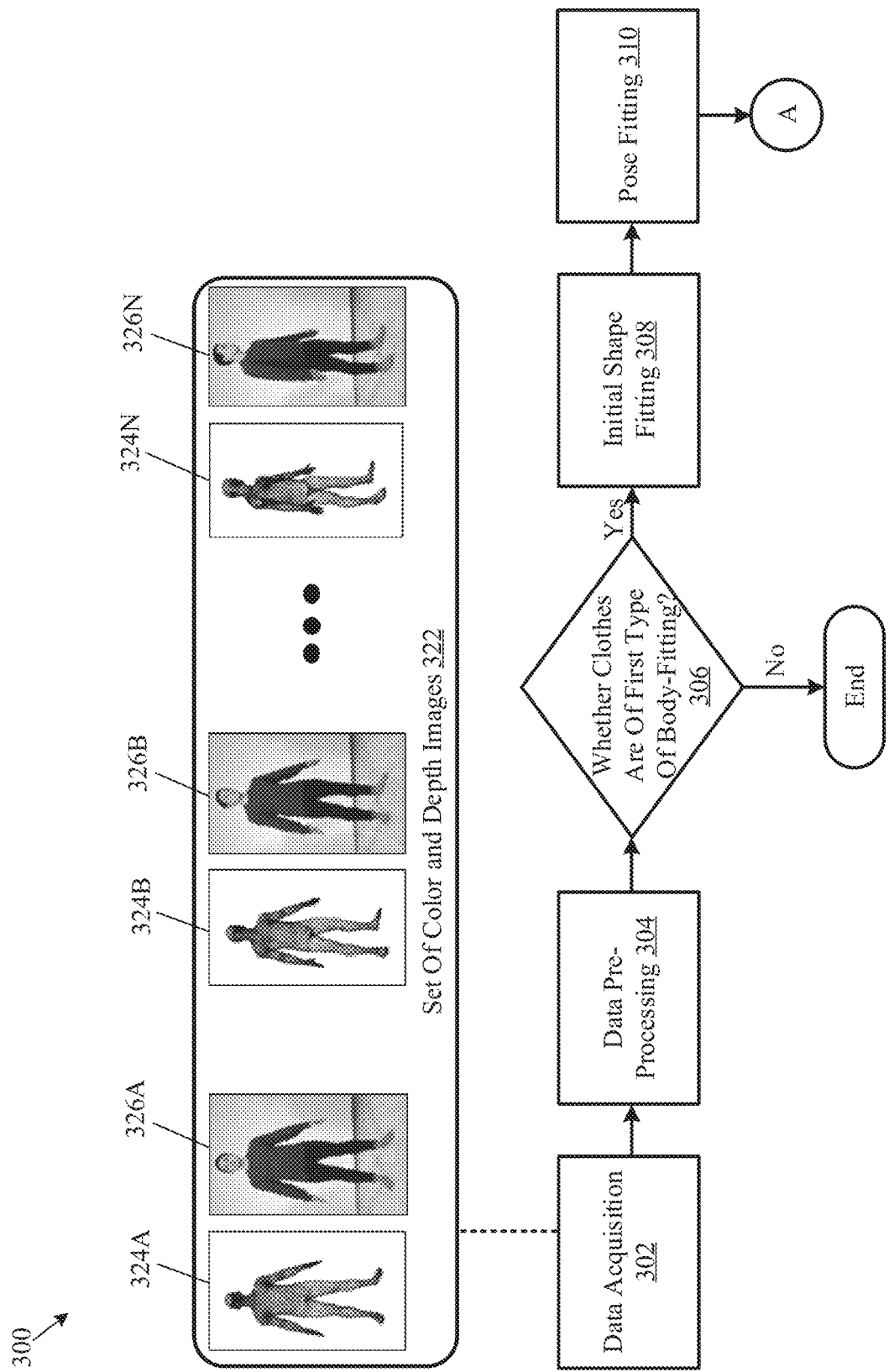
FIGS. 3A and 3B are diagrams that collectively illustrate an exemplary processing pipeline for three-dimensional (3D) human modeling under a specific body-fitting of clothes, in accordance with an embodiment of the disclosure.
Figure 3B:
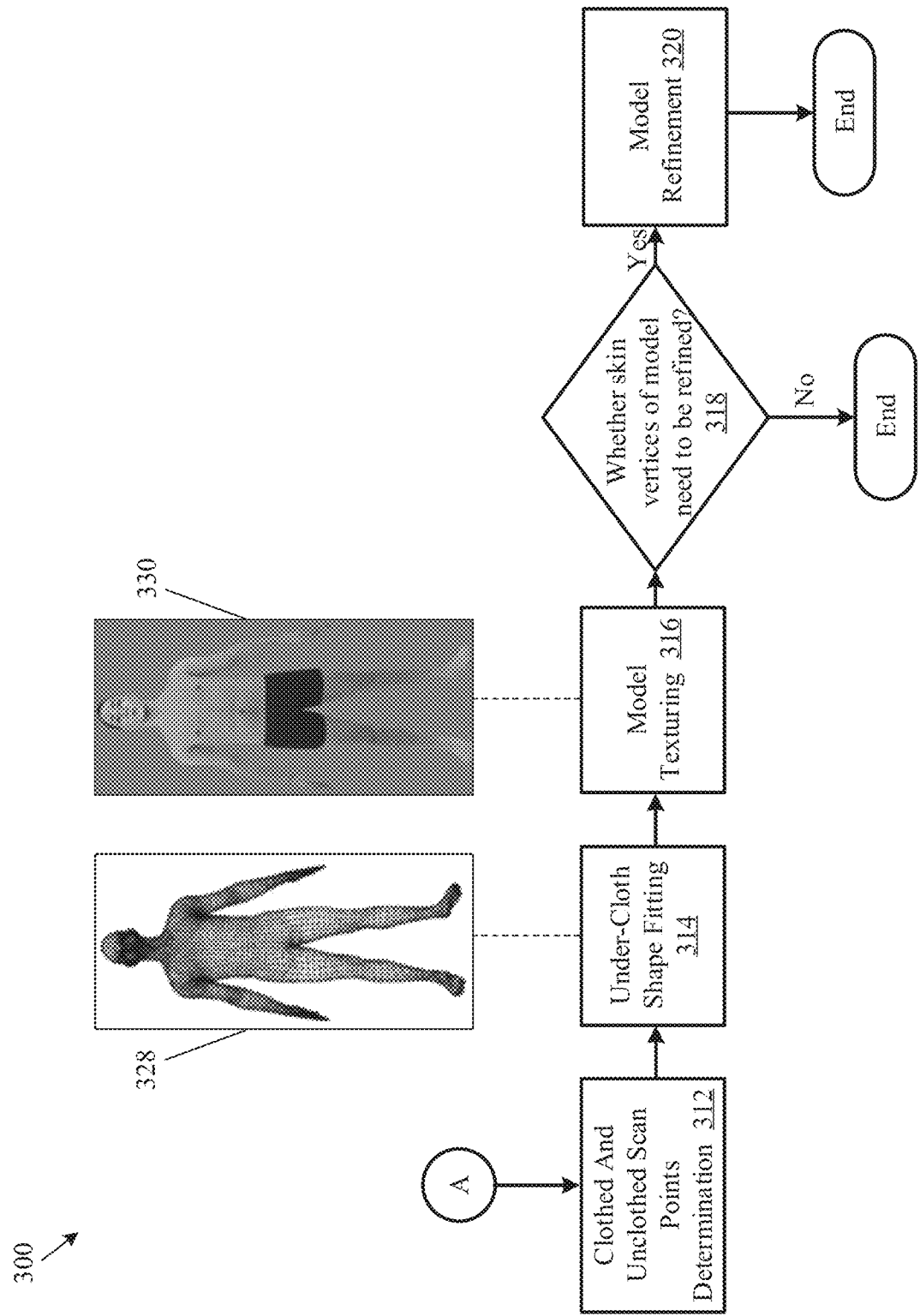

FIGS. 3A and 3B are diagrams that collectively illustrate an exemplary processing pipeline for three-dimensional (3D) human modeling under a specific body-fitting of clothes, in accordance with an embodiment of the disclosure. FIGS. 3A and 3B are explained in conjunction with elements from FIG. 1 and FIG. 2. With reference to FIGS. 3A and 3B, there is shown a processing pipeline 300 of operations from 302 to 320 to depict 3D human modeling under specific body-fitting.

At 302, data may be acquired. In an embodiment, the circuitry 202 may be configured to acquire data that includes a set of color images of the body of the person 110 wearing clothes and a set of depth images corresponding to the set of color images. In an embodiment, the image sensor 106A of the sensing device 106 may capture the set of color images of the body of the person 110. Each of the set of color images may be captured from a particular viewpoint such that the set of color images collectively captures a 360 degrees-view of the body of the person 110. Alternatively, instead of covering the entire body, the body modeling may be possible with a frontal view only (i.e. RGB and depth from a single frontal view), as a human body prior is already present. With the frontal view, the modeling accuracy may be slightly sacrificed in comparison to a 360 degree scan. The sensing process (i.e. the capture or acquisition of color and depth images) may include an RGB and depth video sequence or a single frame capture (which is depth and RGB together) of the frontal view.

In an embodiment, the depth sensor 106B of the sensing device 106 may capture the set of depth images corresponding to the set of color images of the body of the person 110. For example, the depth sensor 106B may capture a depth image, which may be represented as a grayscale image. The depth image may include depth values corresponding to pixels of a corresponding color image of the body. The captured depth image of the body may include information about "Z" coordinates of the body of the person 110. For example, the depth values may include details on a protuberance of a nose, a depth of cheek region with respect to a forehead region, a depth of a neck region, a depth of a shoulder region, a depth of an arm and hand region, a depth of stomach region, a depth of a leg region, a depth of a foot region, and depths of other regions of the body.

In an embodiment, each of the set of color images and each corresponding depth image of the set of depth images may be aligned with each other such that a color image and a corresponding depth image of the body of the person 110 may correspond to a common viewpoint (such as a front view of the body). The alignment may be done by use of a suitable alignment method (which may be known to one skilled in the art).

The sensing device 106 may be configured to transmit the captured set of color images and the set of depth images to the electronic device 102, via the communication network 108. Alternatively, the circuitry 202 may acquire the set of color images and the set of depth images from the sensing device 106. For example, in a scenario where the sensing device 106 is implemented as a component of the electronic device 102, the circuitry 202 of the electronic device 102 may acquire set of the color images and the set of depth images directly from the sensing device 106, via an I/O interface. An example of sets of color and depth images 322, as acquired from the sensing device 106, is shown. The set of color images may include a first color image 324A, a second color image 324B, ... and an Nth color image 324N. Similarly, the set of depth images may include a first depth image 326A, a second depth image 326B, ... and an Nth depth image 326N. The sets of color and depth images 322 may be also referred to as an RGBD video of the body of the person 110.

At 304, the acquired data may be pre-processed. In an embodiment, the circuitry 202 may be configured to pre-process the acquired data. The pre-processing may include acquisition of set of depth scans of the person 110. In an embodiment, the electronic device 102 may be configured to acquire the set of depth scans of the person 110. Each depth scan may be a 3D scan that may be acquired by a back-projection of a corresponding depth image of the received set of depth images to 3D space. The back-projection may be based on intrinsic parameters of an imaging device (e.g., the sensing device 106) that captures the set of color images and the set of depth images (such as the sets of color and depth images 322). Examples of the intrinsic parameters may include, but are not limited to, a focal length, an aperture, an image sensor format, a principal point, a scale factor, and a lens distortion associated with the sensing device 106.

The pre-processing may further include extraction of a set of facial features of the person 110. In an embodiment, the circuitry 202 may be configured to detect a face of the person 110 in one or more of the received set of color images. The face may be detected by application of one or more facial detection techniques on one or more of the received set of color images (such as the first color image 324A, the second color image 324B, ... and the Nth color image 324N). In an embodiment, the circuitry 202 may extract a set of facial features of the person 110 in one or more of the received set of color images (such as the first color image 324A, the second color image 324B, ... and the Nth color image 324N) based on the detection of the face. Examples of the set of facial features may include, but are not limited to, eyes, eyebrows, nose, cheeks, ears, forehead, mouth, lips, and chin.

The pre-processing may further include extraction of a foreground mask associated with each of the set of depth scans. In an embodiment, the circuitry 202 may be configured to extract the foreground mask associated with each of the set of depth scans from the sensing device 106. The foreground mask may be indicative of a foreground region in each of the set of color images and each corresponding depth image in the set of depth images. The foreground region may include at least a portion of the body of the person 110.

At 306, it may be determined whether the clothes worn by the person 110 are of a first type of body-fitting. In an embodiment, the circuitry 202 may be configured to determine whether the clothes worn by the person 110 are of the first type of body-fitting. In an embodiment, such determination may be based on a user input from a user who may be associated with the electronic device 102. The clothes worn by the person 110 may correspond to the first type of body-fitting if the measurement of the clothes is greater than a corresponding measurement of the body by a first threshold. For example, if a chest size of the person 110 is 39 inches and a first threshold for the chest is 2 inches, clothes, then T-shirts or shirts having a chest size of at least 42 inches may correspond to the first type of body-fitting. As another example, if a waist size of the person 110 is 32.5 inches and a first threshold for the waist is 2 inch, then clothes, such as a pant or shorts having a waist size of at least 34.5 inches may correspond to the first type of body-fitting. Examples of the clothes (that correspond to the first type of body-fitting) may include, but are not limited to, shirts, T-shirts, sweaters, cardigans, long pants, shorts, short skirts, jackets, and coats. In some instances, clothes of the first type of body-fitting may be semi tight-fitting clothes, which may have a relatively loose body-fitting in comparison to tight body-hugging clothes (for example, skin-tight gym wear).

In case it is determined that the clothes worn by the person 110 are not of the first type of body-fitting (for example, the clothes are tight clothes or very loose clothes), control may pass to end. Otherwise, control may pass to 308.

At 308, an initial shape-fitting may be executed. In an embodiment, the circuitry 202 may execute the initial shape fitting to generate an initial body model. The circuitry 202 may be configured to generate the initial body model of the person 110 based on a first shape-fitting (also referred to as the initial shape fitting) of a human body prior with at least a first depth scan of the acquired set of depth scans.

In an embodiment, the circuitry 202 may receive the human body prior (e.g., the human body prior 204A) from the server 104, in case the human body prior is not already stored on the memory 204. The human body prior may be a parametric human body model and may include at least one of, but not limited to, a male body template, a female body template, a set of Principal Component Analysis (PCA) shape parameters, and a set of pose parameters. In an embodiment, the body shape of the person 110 may be estimated by fitting the human body prior to the RGBD data in the acquired set of depth scans and estimating the corresponding shape and pose parameters of the human body prior. By way of an example, and not limitation, the human body prior may be a Skinned Multi-Person Linear-X (SMPL-X) model, as described in, Pavlakos et al., "Expressive Body Capture: 3D Hands, Face, and Body from a Single Image", Proceedings IEEE Conf. on Computer Vision and Pattern Recognition (CVPR), 2019. The SMPL-X model is an upgrade of the SMPL model, as described in, Loper et. al., "SMPL: A Skinned Multi-Person Linear Model", ACM Trans. Graphics (Proc. SIGGRAPH Asia), 2015. In comparison to the SMPL model, the SMPL-X model may be suitable for dealing with movement of fingers, mouth, and facial expressions. By way of another example, and not limitation, the human body prior may be a Shape Completion and Animation of People (SCAPE) model, as described in, D. Anguelov, et al., "SCAPE: Shape Completion and Animation of People", ACM Trans. Graphics (Proc. SIGGRAPH), 2005.

In an embodiment, the first shape-fitting of the human body prior with at least the first depth scan may correspond to a minimization of a first cost function which includes one or more of, but not limited to, a first data term, a first face term, a penalization term, and a symmetricity term. The first data term may measure a distance between the human body prior and the first depth scan. The first face term may measure a distance between the extracted set of facial features (at 304) from one or more of the set of color images of the person 110 and a set of facial landmarks of the human body prior. The first face term may ensure that the face of the person 110 is in a correct position and shape. In addition, the penalization term may be used to penalize a set of vertices of the human body prior that fits outside a foreground mask (obtained from the first depth scan at 304).

The symmetricity term may be used to enforce a symmetry in a body shape of the initial body model. For example, in case one arm of the person 110 is visible in the set of color images and the other arm is occluded, it may be possible that one of the arms may be longer than another and may lead to an asymmetrical shape of the body. The symmetricity term may ensure that such asymmetric shapes can be made symmetrical. By way of example, and not limitation, the first cost function may be represented by equation (1), which may be given as follows:

$$E = E_{data} + \lambda_s E_{Face} + \lambda_{bp} E_{BP} + \lambda_{symm} E_{symm} \quad (1)$$

where,

E may represent the first cost function that may be minimized for the first shape-fitting of the human body prior with at least the first depth scan, $E_{data}$ may represent the first data term, $E_{Face}$ may represent the first face term, $\lambda_s$ may represent a weight associated with the first face term, $E_{BP}$ may represent the penalization term, $\lambda_{bp}$ may represent a weight associated with the penalization term, $E_{symm}$ may represent the symmetricity term, and $\lambda_{symm}$ may represent a weight associated with the symmetricity term.

For the first shape-fitting, one out of a pre-defined number (e.g., ten) of RGBD frames may be processed for the generation of the initial body model. In an embodiment, the circuitry 202 may execute an iterative closest point (ICP) refinement between RGBD frames to improve an alignment accuracy between the initial body model and one or more of the acquired set of depth scans. Based on the first shape-fitting (and the ICP refinement), the initial body model may be generated.

At 310, a pose-fitting may be executed to obtain a posed-body model. In an embodiment, the circuitry 202 may be configured to obtain the posed-body model based on the pose-fitting of the generated initial body model with at least one depth scan of the acquired set of depth scans. The pose-fitting may be used to estimate pose parameters of the posed-body model.

In an embodiment, the circuitry 202 may detect a two-dimensional (2D) human pose in at least a first color image of the set of color images of the person 110. The 2D pose may be detected in the first color image by application of, for example, an OpenPose framework, as described in, Cao, Zhe, et al., "Realtime multi-person 2D pose estimation using part affinity fields", CVPR, 2017. After pose detection, the circuitry 202 may be configured to generate a rigid-aligned body model by a minimization of distance between a set of joint landmarks of the initial body model and corresponding joint positions in the detected 2D human pose. Thereafter, for the pose-fitting, the rigid-aligned body model may be used, as described herein.

The pose-fitting may correspond to a minimization of a second cost function which includes one or more of, but not limited to, a second data term, a second face term, and a smoothening term. The second data term may measure a distance between the rigid-aligned body model and at least one depth scan of the acquired set of depth scans. Similarly, the second face term may measure a distance between a set of facial features in one or more color images of the set of color images of the person 110 and a set of facial landmarks of the human body prior. Similarly, the smoothening term may be used to maximize a smoothness of a pose change between depth scans of the acquired set of depth scans. The smoothening term may ensure that the motion of body in between different images (of the set of color images) remains smooth and there is minimal or no flickering between the images. By way of example, and not limitation, the second cost function may be represented by equation (2), which may be given as follows:

$$E = E_{data} + \lambda_s E_{Face} + \lambda_{smooth} E_{smooth} \quad (2)$$

where,

E may represent the second cost function that may be minimized for the pose-fitting of the generated initial body model with the at least one depth scan, $E_{data}$ may represent the second data term, $E_{Face}$ may represent the second face term, $\lambda_s$ may represent a weight associated with the second face term, $E_{smooth}$ may represent the smoothening term, and $\lambda_{smooth}$ may represent a weight associated with the smoothening term.

At 312, clothed scan points and unclothed scan points may be determined. In an embodiment, the circuitry 202 may be configured to determine the clothed scan points and the unclothed scan points (skin points) in each of the acquired set of depth scans. The unclothed scan points may correspond to one or more body parts, of which at least a portion of skin remains uncovered by the clothes. Whereas, the clothed scan points may correspond to one or more body parts, of which at least a portion of skin remains covered by the clothes.

In order to determine the clothed scan points and the unclothed scan points, an image-based skin detection process may be executed, as described herein. The circuitry 202 may be configured to identify one or more unclothed parts of the obtained posed-body model. In an embodiment, the identification may be based on a user input from a user of the electronic device 102 and may include an assignment of an identifier to each of the one or more unclothed parts. Examples of the identified one or more unclothed parts may include one or more of, but not limited to, a face portion, a head portion, a neck portion, a hand portion, or a leg portion of the person 110. After the identification is done, the circuitry 202 may be configured to extract pixel information from each of the acquired set of color images. The extracted pixel information may correspond to the identified one or more unclothed parts and may include a 2D location of each pixel in a color image. To extract the pixel information, the circuitry 202 may project the posed-body model onto a 2D image plane based on the intrinsic parameters of the sensing device 106. The pixel information may be extracted based on a correspondence between points belonging to the identified one or more unclothed parts in the projection of the posed-body model and corresponding pixels of the set of color images associated with the acquired set of depth scans.

Based on the extracted pixel information, the circuitry 202 may determine classification information, which may include a set of values, each of which may indicate a likelihood of whether or not a corresponding pixel of the color image belongs to the unclothed (or skin) body part. Thereafter, the circuitry 202 may determine an unclothed skin portion (i.e. skin pixels) in one or more of the set of color images based on the determined classification information. Skin pixels which belong to the determined unclothed skin portion in a color image may be mapped to a set of points in a respective depth scan of the acquired set of depth scans. Such set of points may be classified as the unclothed scan points. All remaining points in the respective depth scan may be classified as the clothed scan points.

The classification of scan points of each of the acquired set of depth scans into the clothed scan points and the unclothed scan points may be necessary for under-clothed skin modeling. While the unclothed scan points (that corresponds to exposed skin) may provide information associated with accurate body shape of the person 110, the clothed scan points (that corresponds to unexposed skin covered by clothes) may provide information associated with an outer bound of the body shape of the person 110. The circuitry 202 may be configured to merge per-frame skin detection results (i.e., the clothed scan points and the unclothed scan points determined in each depth scan of the acquired set of depth scans) and label corresponding global skin vertices in the posed-body model. Scan points corresponding to, for example, a head portion, a neck portion, hand portions, and feet portions may be determined as the unclothed scan points in each of the acquired set of depth scans. Whereas, scan points corresponding to, for example, a chest-and-stomach portion, arm portions, and leg portions may be determined as the clothed scan points in each of the acquired set of depth scans.

At 314, an under-cloth shape fitting may be executed. The circuitry 202 may be configured to generate the final body model of the person 110 based on a second shape-fitting (which is also referred to as the under-cloth shape fitting) of vertices that may belong to the posed-body model and may correspond to an under-cloth skin portion of the body of the person 110. The second shape-fitting may be done based on the determined clothed scan points and the determined unclothed scan points. As shown, for example, a body model 328 may be generated as the final body model.

In order to obtain the final body model, the circuitry 202 may be configured to update initial shape parameters associated with the posed-body model, by a frame-by-frame minimization of a third cost function. The frame-by-frame minimization may correspond to the second shape-fitting (i.e., the under-cloth shape fitting) of the posed-body model. In an embodiment, the third cost function may include one or more of, but not limited to, a skin term, a first penalization term, a fit term, a third face term, and a second penalization term. The skin term may fit the posed-body model to a surface of a depth scan of the acquired set of depth scans. The first penalization term may penalize a first set of vertices of the obtained posed-body model which may be fitted outside a clothed portion. The clothed portion corresponds to the clothed scan points of the depth scan. The fit term may reduce a distance between a second set of vertices of the posed-body model and corresponding points of the depth scan. The second set of vertices may be fitted inside the clothed portion that corresponds to the clothed scan points of the depth scan. The third face term may measure a distance between a set of facial features in one or more color images (of the set of color images of the person 110) and a set of facial landmarks of the human body prior. The second penalization term may penalize a set of vertices of the obtained posed-body model which fit outside the foreground mask (obtained from the depth scan). By way of example, and not limitation, the third cost function may be represented by equation (3), which may be given as follows:

$$E = E_{skin} + \lambda_{clothes}(E_{clothes} + \lambda_{fit}E_{fit}) + \lambda_{s}E_{Face} + \lambda_{bp}E_{BP} \quad (3)$$

where,

E may represent the third cost function that may be frame-by-frame minimized for the second shape-fitting (i.e., the under-cloth fitting), $E_{skin}$ may represent the skin term, $E_{clothes}$ may represent the first penalization term, $\lambda_{clothes}$ may represent a weight associated with the first penalization term, $E_{fit}$ may represent the fit term, $\lambda_{fit}$ may represent a weight associated with the fit term, $E_{Face}$ may represent the third face term, $\lambda_{s}$ may represent a weight associated with the third face term, $E_{BP}$ may represent the second penalization term, and $\lambda_{bp}$ may represent a weight associated with the second penalization term.

In an embodiment, the final body model may be generated based on the updated shape parameters and pose parameters associated with the posed-body model.

At 316, the model (i.e., the final body model) may be textured. In an embodiment, the circuitry 202 may be configured to texture the generated final body model. The generated final body model may be textured based on a skin texture map for the body of the person 110. As shown, for example, the body model 328 may be textured to generate a textured body model 330. The skin texture map may include a first skin texture for an unclothed skin region of the generated final body model and a second skin texture for an under-cloth skin region of the generated final body model. The texturing of the generated final body model is described, for example, in FIG. 4.

At 318, it may be determined whether skin vertices of the textured body model 330 need to be refined. In an embodiment, the circuitry 202 may determine whether the skin vertices of the textured body model 330 are to be refined. In an embodiment, the determination of whether the skin vertices need to be refined may be based on a user input from a user associated with the electronic device 102. In another embodiment, the determination of whether the skin vertices need to be refined may be based on an application area where the 3D human body modeling is to be used. For example, in application areas that require a real-time generation of the 3D human body model and in time-critical application areas (e.g., real or near-real time rendering applications), the circuitry 202 may determine that the skin vertices need not be refined so as to avoid additional processing time associated with the refinement of the skin vertices. Examples of such real-time or time-critical application areas may include, but are not limited to, telepresence, teleconferencing, and virtual space sharing. In application areas that require a greater accuracy (or quality) of the 3D human body model, the circuitry 202 may determine that the skin vertices need to be refined. Examples of such application areas may include, but are not limited to, gaming, virtual reality, augmented reality, and virtual try-on. In case it is determined that the skin vertices need not be refined, control may pass to end. Otherwise, in case it is determined that the skin vertices require refinement, control may pass to 320.

At 320, the model (i.e., the final body model) may be refined. In an embodiment, the circuitry 202 may be configured to refine the final body model to generate a refined body model by fitting the final body model to variables of a shape refinement cost function. Based on the refinement of the first body model, person-specific details may be recovered on exposed or unclothed skin portion of the person 110. By way of example, and not limitation, to achieve vertexlevel accuracy, the final body model may be fitted with skin vertices as the variables of the shape refinement cost function. The shape refinement cost function may be minimized to generate the refine body model. The shape refinement cost function may include a skin geometry distance term, a skin texture verification term, a fourth face term, a consistency term, and a smoothness term. The skin geometry distance term may measure a geometry distance between the final body model and the unclothed scan points in at least one first depth scan of the acquired set of depth scans. The skin texture verification term may match a back-projected textured body model (e.g., a projection of the textured body model 330) with one or more of the set of color images. The fourth face term may measure a distance between a set of facial features in one or more color images (of the set of color images of the person 110) and a set of facial landmarks of the human body prior. The consistency term may maximize a consistency between a first set of vertices of the final body model and a second set of vertices of the refined body model. The smoothness term may maximize a smoothness of 3D meshes associated with the refined body model. By way of example, and not limitation, the shape refinement cost function may be represented by equation (4), which may be given as follows:

$$E = E_{Geometry}^{Skin} + \lambda_a E_{RGB}^{Skin} + \lambda_f E_{Face} + \lambda_c E_{Consistency} + \lambda_s E_{Smooth} \quad (4)$$

where,

E may represent the shape refinement cost function that may be minimized for the refinement of the final body model to generate the refined body model, $E_{Geometry}^{Skin}$ may represent the skin geometry distance term, $E_{RGB}^{Skin}$ may represent the skin texture verification term, $\lambda_a$ may represent a weight associated with the skin texture verification term, $E_{Face}$ may represent the fourth face term, $\lambda_f$ may represent a weight associated with the fourth face term, $E_{Consistency}$ may represent the consistency term, $\lambda_c$ may represent a weight associated with the consistency term, $E_{smooth}$ may represent the smoothness term, and $\lambda_s$ may represent a weight associated with the smoothness term.

The refinement of the final body model may improve an accuracy of skin exposed body regions (i.e., regions in the final body model that correspond to the unclothed scan points in the acquired depth scans). In an embodiment, the refined final body model may be textured based on the skin texture map for the body of the person 110. The texturing of the refined final body model may be similar to the texturing of the final body model, as described, for example, 316 and FIG. 4. Control may pass to end.

Figure 4:
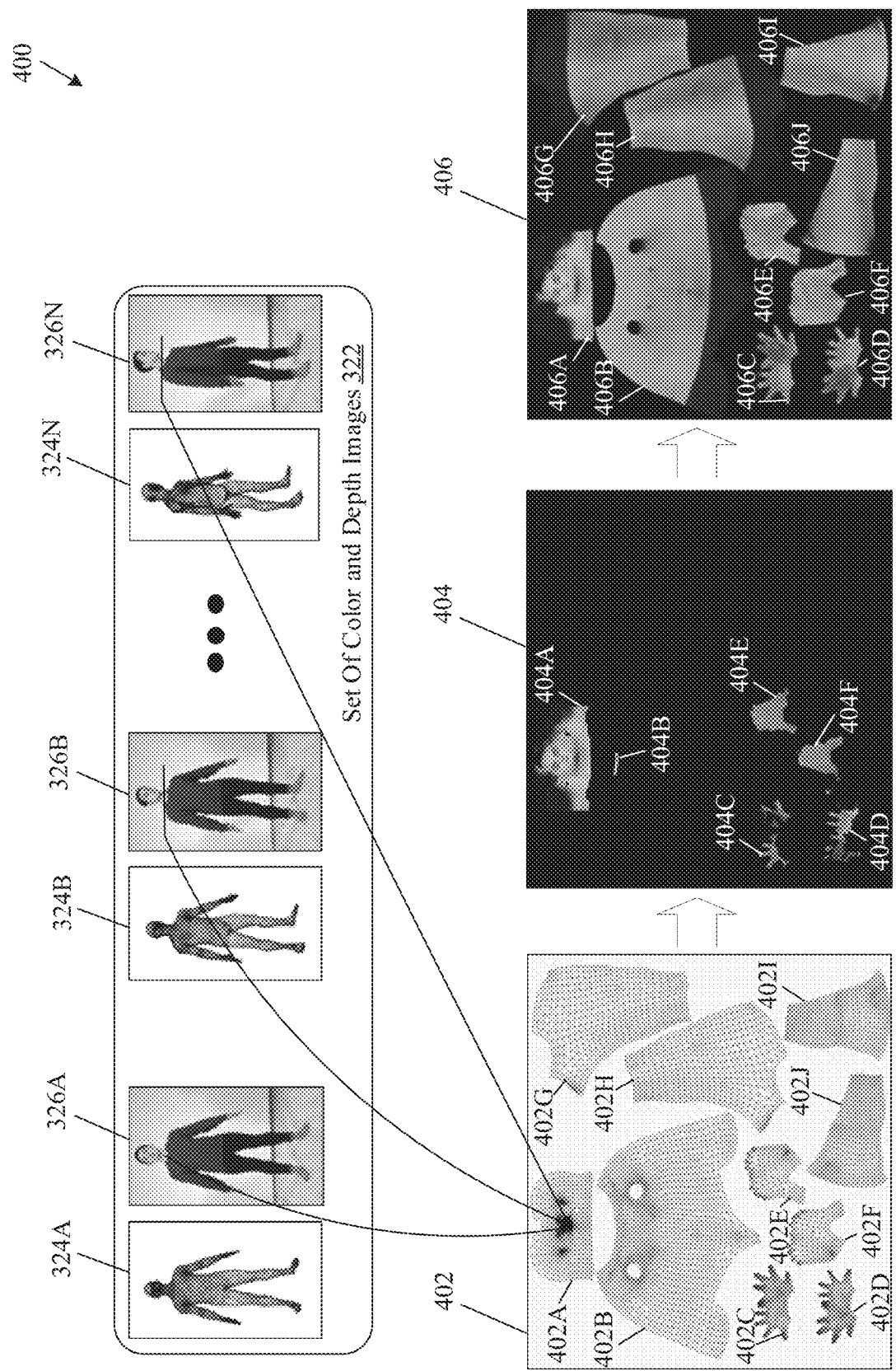
FIG. 4 is a diagram that illustrates an exemplary scenario for texturing a body model of a person based on a skin texture map, in accordance with an embodiment of the disclosure.

FIG. 4 is a diagram that illustrates an exemplary scenario for texturing a body model of a person based on a skin texture map, in accordance with an embodiment of the disclosure. FIG. 4 is described in conjunction with elements from FIGS. 1, 2, 3A, and 3B. With reference to FIG. 4, there is shown an exemplary scenario 400. The scenario 400 includes a texture layout 402, an initial texture map 404, and a skin texture map 406. In FIG. 4, there is further shown the sets of color and depth images 322.

The texture layout 402 may be a layout of a texture map of the body of the person 110. The texture layout 402 may include a set of regions such as, but not limited to, a head-and-neck portion 402A, a chest-and-stomach portion 402B, a first hand portion 402C, a second hand portion 402D, a first foot portion 402E, a second foot portion 402F, a first leg portion 402G, a second leg portion 402H, a first arm portion 402I, and a second arm portion 402J. In an embodiment, the circuitry 202 may be configured to determine the texture layout 402 based on one or more of the set of color images of the person 110. As shown, for example, the head-and-neck portion 402A in the texture layout 402 may be determined based on a head portion and a neck portion in one of more of the set of color images, such as the first color image 324A, the second color image 324B, . . . and the Nth color image 324N.

In an embodiment, the circuitry 202 may be configured to generate an initial texture map based on a mapping of skin pixels in one or more color images (of the set of color images of the person 110) to a UV coordinate map. For example, the initial texture map 404 may be generated based on the mapping of the skin pixels (that correspond to the unclothed scan points of the set of depth scans) in the one or more color images (e.g., the first color image 324A, the second color image 324B, . . . and the Nth color image 324N) to the UV coordinate map. The mapping of the skin pixels may be further based on the texture layout 402.

In an embodiment, the initial texture map 404 may include one or more first regions and a second region. The one or more first regions may miss a first skin texture of the under-cloth skin portion of the body in the one or more color images. For example, in the initial texture map 404, which correspond to a middle and a lower part of the chest-and-stomach portion 402B, the first leg portion 402G, the second leg portion 402H, the first arm portion 402I, and the second arm portion 402J may not include the first skin texture of the under-cloth skin portion (from color image(s)). In contrast, the second region may be filled with a second skin texture of the unclothed skin portion of the body (as included in the one or more color images). After the mapping of the skin pixels, texture information may be extracted from the one or more images for the pixels associated with the second region and filled in the second region of the initial texture map 404. As shown, for example, the second region may include a head-and-neck portion 404A, an upper-chest-and-stomach portion 404B, a first hand portion 404C, a second hand portion 404D, a first foot portion 404E, and a second foot portion 404F.

In an embodiment, the circuitry 202 may be configured to apply a lighting correction to the generated initial texture map 404 based on spherical harmonics. Thereafter, the circuitry 202 may fill the one or more first regions (initially missing the texture) of the generated initial texture map 404 with a color-tuned skin texture, based on the application of the lighting correction. The circuitry 202 may generate the skin texture map 406 based on a UV map blending of the filled one or more first regions and the second region. As an example, the skin texture map 406 may include a head-and-neck portion 406A, a chest-and-stomach portion 406B, a first hand portion 406C, a second hand portion 406D, a first foot portion 406E, a second foot portion 406F, a first leg portion 406G, a second leg portion 406H, a first arm portion 406I, and a second arm portion 406J. The generated skin texture map 406 may include a first skin texture for an unclothed skin region of the generated final body model (e.g., the body model 328) and a second skin texture for an under-cloth skin region of the generated final body model (i.e., the body model 328). Examples of the unclothed skin region may include, but are not limited to, the head-and-neck portion 406A, the first hand portion 406C, the second hand portion 406D, the first foot portion 406E, and the second foot portion 406F. Examples of the under-cloth skin region may include, but are not limited to, the chest-and-stomach portion 406B, the first leg portion 406G, the second leg portion 406H, the first arm portion 406I, and the second arm portion 406J. In an embodiment, the circuitry 202 may texture the generated final body model (e.g., the body model 328) based on the generated skin texture map 406 to obtain a textured body model (e.g., the textured body model 330).

Figure 5:
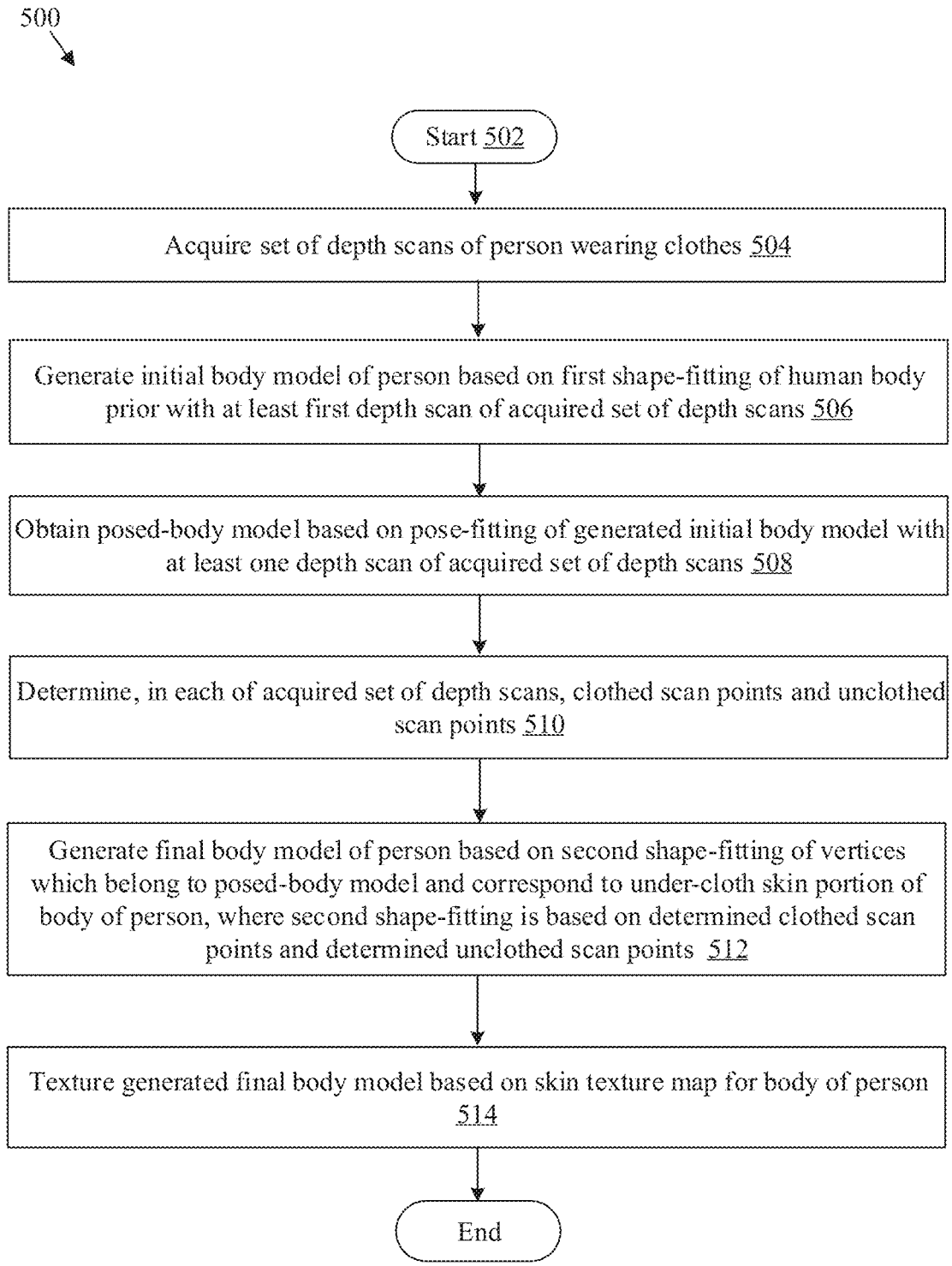
FIG. 5 is a flowchart that illustrates exemplary operations for three-dimensional (3D) human modeling under a specific body-fitting of clothes, in accordance with an embodiment of the disclosure.

FIG. 5 is a flowchart that illustrates exemplary operations for three-dimensional (3D) human modeling under a specific body-fitting of clothes, in accordance with an embodiment of the disclosure. FIG. 5 is described in conjunction with elements from FIGS. 1, 2, 3A, 3B, and 4. With reference to FIG. 5, there is shown a flowchart 500. The flowchart 500 may include operations 504 to 514 may be implemented in the electronic device 102. The flowchart 500 may start at 502 and proceed to 504.

At 504, a set of depth scans of the person 110 wearing the clothes may be acquired. In an embodiment, the circuitry 202 may be configured to acquire the set of depth scans of the person 110. The first type of body-fitting may imply that a measurement of the clothes is greater than a corresponding measurement of the body by a first threshold. For example, if the measurement of a chest of the person 110 is 39 inches and the first threshold is 3 inches, a T-shirt of size 42 inches may be a cloth of the first type of body-fitting for the person 110.

The sensing device 106 may be configured to capture the set of color images of a body of the person 110 and the set of depth images corresponding to the set of color images from a set of viewpoints. For example, the image sensor 106A may capture the set of RGB color images of the body of the person 110 and the depth sensor 106B may capture the set of depth images corresponding to the set of RGB color images of the body. Each RGB color image and the corresponding depth image may be captured from a certain viewpoint such that the set of RGB color images and the corresponding set of depth images may together correspond to a 3D scan (such as 360 degrees scan or 270 degrees scan) of the person 110. Together, the sensing device 106 may capture RGB-Depth (RGBD) data of the body of the person 110. For example, the sets of color and depth images 322 may be captured as the RGBD data of the body of the person 110. Alternatively, instead of covering the entire body, the body modeling may be possible with a frontal view only (i.e. RGB and depth from a single frontal view), as a human body prior is already present. With the frontal view, the modeling accuracy may be slightly sacrificed in comparison to a 360 degree scan. The sensing process (i.e. the capture or acquisition of color and depth images) may include an RGB and depth video sequence or a single frame capture (which is depth and RGB together) of the frontal view.

The sensing device 106 may be configured to transmit the captured set of color images and the set of depth images corresponding to the set of color images of the body of the person 110, to the electronic device 102, via the communication network 108.

In an embodiment, the circuitry 202 of the electronic device 102 may receive the set of color images of the body of the person 110 and the set of depth images corresponding to the set of color images of the body of the person 110 from the sensing device 106. The circuitry 202 of the electronic device 102 may be configured to acquire the set of depth scans of the person 110. Each depth scan of the set of depth scans may be a 3D scan that may be acquired by a back-projection of a corresponding depth image of the received set of depth images to 3D space. The back-projection may be based on intrinsic parameters of an imaging device (e.g., the sensing device 106) which may capture the set of color images and the set of depth images. The acquisition of the set of depth scans is described further, for example, in FIG. 3A.

At 506, an initial body model of the person 110 may be generated based on a first shape-fitting of a human body prior with at least a first depth scan of the acquired set of depth scans. In an embodiment, the circuitry 202 may be configured to generate the initial body model of the person 110 based on the first shape-fitting of the human body prior with at least the first depth scan of the acquired set of depth scan. The generation of the initial body model is described further, for example, in FIG. 3A.

At 508, a posed-body model may be obtained based on a pose-fitting of the generated initial body model with the at least one depth scan of the acquired set of depth scans. In an embodiment, the circuitry 202 may be configured to obtain the posed-body model. Details on the pose-fitting are described further, for example, in FIG. 3A.

At 510, clothed scan points and unclothed scan points may be determined in each of the acquired set of depth scans. In an embodiment, the circuitry 202 may be configured to determine the clothed scan points and the unclothed scan points in each of the acquired set of depth scans. The circuitry 202 may use an image-based skin detection technique to determine the clothed scan points and the unclothed scan points. The unclothed scan points may correspond to one or more body parts, of which at least a portion of skin remains uncovered by the clothes. Whereas, the clothed scan points may correspond to one or more body parts, of which at least a portion of skin remains covered by the clothes. For example, scan points corresponding to one or more of, but not limited to, a head portion, a neck portion, hand portions, and feet portions may include the unclothed scan points in the acquired set of depth scans. Further, scan points corresponding to one or more of, but not limited to, a chest-and-stomach portion, arm portions, and leg portions may include the clothed scan points in the acquired set of depth scans. The determination of the clothed scan points and the unclothed scan points is described further, for example, in FIG. 3B.

At 512, a final body model may be generated based on a second shape-fitting of the vertices which may belong to the posed-body model and may correspond to the under-cloth skin portion of the body of the person 110. The second shape-fitting may be based on the determined clothed scan points and the unclothed scan points. In an embodiment, the circuitry 202 may be configured to generate the final body model. The generation of the final body model is described further, for example, in FIG. 3B.

At 514, the generated final body model may be textured based on a skin texture map for the body of the person 110. In an embodiment, the circuitry 202 may be configured to texture the generated body model based on the skin texture map of the body of the person 110. For example, the body model 328 may be textured to generate the textured body model 330. The skin texture map may include the first skin texture for the unclothed skin region of the generated final body model and the second skin texture for the under-cloth skin region of the generated final body model. The texturing of the generated final body model is described further, for example, in FIG. 4. Control may pass to the end.

Although the flowchart 500 is illustrated as discrete operations, such as 502, 504, 505, 508, 510, 512, and 514, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102). The instructions may cause the electronic device 102 to perform operations that include acquiring a set of depth scans of a person (e.g., the person 110) wearing clothes. The operations may further include generating an initial body model of the person 110 based on a first shape-fitting of a human body prior (e.g., the 3D human body prior 204A) with at least a first depth scan of the acquired set of depth scans. The operations may further include obtaining a posed-body model based on a pose-fitting of the generated initial body model with at least one depth scan of the acquired set of depth scans. The operations may further include determining, in each of the acquired set of depth scans, clothed scan points and unclothed scan points. The operations may further include generating a final body model (e.g., the body model 328) of the person 110 based on a second shape-fitting of vertices which may belong to the posed-body model and may correspond to an under-cloth skin portion of the body of the person 110. The second shape-fitting may be based on the determined clothed scan points and the determined unclothed scan points. The operations may further include texturing the generated final body model (e.g., the body model 328) based on a skin texture map for the body of the person 110.

Exemplary aspects of the disclosure may provide an electronic device (such as, the electronic device 102 of FIG. 1) that includes circuitry (such as, the circuitry 202). The circuitry 202 may be configured acquire a set of depth scans of a person (e.g., the person 110) wearing clothes. The circuitry 202 may be further configured to generate an initial body model of the person 110 based on a first shape-fitting of a human body prior (e.g., the 3D human body prior 204A) with at least a first depth scan of the acquired set of depth scans. The circuitry 202 may be further configured to obtain a posed-body model based on a pose-fitting of the generated initial body model with at least one depth scan of the acquired set of depth scans. The circuitry 202 may be further configured to determine, in each of the acquired set of depth scans, clothed scan points and unclothed scan points. The circuitry 202 may be further configured to generate a final body model (e.g., the body model 328) of the person 110 based on a second shape-fitting of vertices which may belong to the posed-body model and may correspond to an under-cloth skin portion of the body of the person 110. The second shape-fitting may be based on the determined clothed scan points and the determined unclothed scan points. The circuitry 202 may be further configured to texture the generated final body model (e.g., the body model 328) based on a skin texture map for the body of the person 110.

In an embodiment, the unclothed scan points may correspond to one or more body parts, of which at least a portion of skin may remain uncovered by the clothes. In an embodiment, the clothes may correspond to a first type of body-fitting, which may imply that a measurement of the clothes may be greater than a corresponding measurement of the body by a first threshold.

In an embodiment, the human body prior (e.g., the 3D human body prior 204A) may include at least one of, but not limited to, a male body template, a female body template, a set of Principal Component Analysis (PCA) shape parameters, or a set of pose parameters.

In an embodiment, the circuitry 202 may be configured to receive a set of color images and a set of depth images corresponding to the set of color images. For example, the sets of color and depth images 322 may be received. In an embodiment, each depth scan of the set of depth scans may be a 3D scan which may be acquired by a back-projection of a corresponding depth image of the received set of depth images to 3D space. The back-projection may be based on intrinsic parameters of an imaging device (e.g., the sensing device 106) which may capture the set of color images and the set of depth images (e.g., the sets of color and depth images 322).

In an embodiment, the circuitry 202 may be configured to detect a face of the person 110 in one or more of the received set of color images (e.g., the first color image 324A, the second color image 324B, . . . and the Nth color image 324N). The circuitry 202 may be further configured to extract a set of facial features based on the detection.

In an embodiment, the first shape-fitting of the human body prior (e.g., the 3D human body prior 204A) with at least the first depth scan may corresponds to a minimization of a first cost function which includes one or more of, but not limited to, a first data term, a first face term, a penalization term, and a symmetricity term. The first data term may measure a distance between the human body prior and the first depth scan. Further, the first face term may measure a distance between the extracted set of facial features from one or more of the set of color images of the person 110 and a set of facial landmarks of the human body prior (e.g., the 3D human body prior 204A). In addition, the penalization term may be used to penalize a set of vertices of the human body prior which may fit outside a foreground mask obtained from with the first depth scan. Further, the symmetricity term may be used to enforce a symmetry in a body shape of the initial body model.

In an embodiment, the circuitry 202 may detect a two-dimensional (2D) human pose in at least a first color image of the set of color images of the person 110. The circuitry 202 may be further configured to generate a rigid-aligned body model by a minimization of distance between a set of joint landmarks of the initial body model and corresponding joint positions in the detected 2D human pose.

In an embodiment, the pose-fitting may correspond to a minimization of a second cost function which includes one or more of, but not limited to, a second data term, a second face term, and a smoothening term. The second data term may measure a distance between the rigid-aligned body model and the at least one depth scan. Further, the second face term may measure a distance between a set of facial features in one or more color images of the set of color images of the person 110 and a set of facial landmarks of the human body prior (e.g., the 3D human body prior 204A). In addition, the smoothening term may be used to maximize a smoothness of a pose change between depth scans of the acquired set of depth scans.

In an embodiment, the circuitry 202 may be configured to update initial shape parameters associated with the posed-body model by a frame-by-frame minimization of a third cost function. The frame-by-frame minimization may correspond to the second shape-fitting (i.e., the under-cloth fitting), and the third cost function may include one or more of, but not limited to, a skin term, a first penalization term, a fit term, a third face term, and a second penalization term. The skin term may fit the posed-body model to a surface of a depth scan of the acquired set of depth scans. Further, the first penalization term may penalize a first set of vertices of the obtained posed-body model which may be fitted outside a clothed portion corresponding to the clothed scan points of the depth scan. In addition, the fit term may reduce a distance between a second set of vertices of the posed-body model and corresponding points of the depth scan. Herein, the second set of vertices may be fitted inside the clothed portion corresponding to the clothed scan points of the depth scan. Further, the third face term may measure a distance between a set of facial features in one or more color images of the set of color images of the person 110 and a set of facial landmarks of the human body prior. Furthermore, the second penalization term may penalize a set of vertices of the obtained posed-body model fitted outside a foreground mask obtained from the depth scan. In an embodiment, the final body model (e.g., the body model 328) may be generated based on updated shape parameters and pose parameters associated with the posed-body model.

In an embodiment, the circuitry 202 may be configured to generate an initial texture map based on a mapping of skin pixels in one or more color images of the person to a UV coordinate map. The generated initial texture map may include, but is not limited to, one or more first regions which may be missing a first texture of the under-cloth skin portion of the body in the one or more color images, and a second region which may be filled with a second texture of an unclothed skin portion of the body in the one or more color images.

In an embodiment, the circuitry 202 may be configured to apply a lighting correction to the generated initial texture map based on spherical harmonics. The circuitry 202 may be further configured to fill the one or more first regions of the generated initial texture map with a color-tuned skin texture, based on the application of the lighting correction. Further, the circuitry 202 may be configured to generate the skin texture map based on a UV map blending of the filled one or more first regions and the second region. In an embodiment, the skin texture map may include a first skin texture for an unclothed skin region of the generated final body model and a second skin texture for an under-cloth skin region of the generated final body model (e.g., the body model 328).

In an embodiment, the circuitry 202 may be configured to refine the final body model (e.g., the body model 328) by fitting the final body model (e.g., the body model 328) to variables of a shape refinement cost function. The refined final body model may be textured based on the skin texture map.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   acquire a set of depth scans of a person wearing clothes;
   generate an initial body model of the person based on a first shape-fitting of a human body prior with at least a first depth scan of the acquired set of depth scans;
   obtain a posed-body model based on a pose-fitting of the generated initial body model with at least one depth scan of the acquired set of depth scans;
   determine, in each of the acquired set of depth scans, clothed scan points and unclothed scan points;
   generate a final body model of the person based on a second shape-fitting of vertices which belong to the posed-body model and correspond to an under-cloth skin portion of a body of the person,
      wherein the second shape-fitting is based on the determined clothed scan points and the determined unclothed scan points;
   generate an initial texture map based on a mapping of skin pixels in one or more color images of the person to a coordinate map, wherein the generated initial texture map comprises:
      one or more first regions which exclude a first texture of the under-cloth skin portion of the body in the one or more color images, and
      a second region which is filled with a second texture of an unclothed skin portion of the body in the one or more color images;
   apply a lighting correction to the generated initial texture map based on spherical harmonics;
   fill the one or more first regions of the generated initial texture map with a color-tuned skin texture, based on the application of the lighting correction;
   generate a skin texture map based on a map blending of the filled one or more first regions and the second region; and
   texture the generated final body model based on the generated skin texture map for the body of the person.

2. The electronic device according to claim 1, wherein the unclothed scan points correspond to one or more body parts, of which at least a portion of skin remains uncovered by the clothes.

3. The electronic device according to claim 1, wherein the clothes correspond to a first type of body-fitting, which implies that a measurement of the clothes is greater than a corresponding measurement of the body by a first threshold.

4. The electronic device according to claim 1, wherein the human body prior includes at least one of a male body template, a female body template, a set of Principal Component Analysis (PCA) shape parameters, or a set of pose parameters.

5. The electronic device according to claim 1, wherein the circuitry is further configured to receive a set of color images and a set of depth images corresponding to the set of color images.

6. The electronic device according to claim 5, wherein each depth scan of the set of depth scans is a 3D scan which is acquired by a back-projection of a corresponding depth image of the received set of depth images to 3D space based on intrinsic parameters of an imaging device which captures the set of color images and the set of depth images.

7. The electronic device according to claim 5, wherein the circuitry is further configured to:
  detect a face of the person in one or more of the received set of color images; and
  extract a set of facial features based on the detection.

8. The electronic device according to claim 7, wherein the first shape-fitting of the human body prior with at least the first depth scan corresponds to a minimization of a first cost function which includes one or more of:
  a first data term which measures a distance between the human body prior and the first depth scan,
  a first face term which measures a distance between the extracted set of facial features and a set of facial landmarks of the human body prior,
  a penalization term to penalize a set of vertices of the human body prior which fits outside a foreground mask obtained from with the first depth scan, and
  a symmetricity term to enforce a symmetry in a body shape of the initial body model.

9. The electronic device according to claim 1, wherein the circuitry is further configured to:
  detect a 2D human pose in at least a first color image of the person; and
  generate a rigid-aligned body model by a minimization of distance between a set of joint landmarks of the initial body model and corresponding joint positions in the detected 2D human pose.

10. The electronic device according to claim 9, wherein the pose-fitting corresponds to minimization of a second cost function which includes one or more of:
  a second data term that measures a distance between the rigid-aligned body model and the at least one depth scan,
  a second face term that measures a distance between a set of facial features in one or more color images of the person and a set of facial landmarks of the human body prior, and
  a smoothening term to maximize a smoothness of a pose change between depth scans of the acquired set of depth scans.

11. The electronic device according to claim 1, wherein the circuitry is further configured to update initial shape parameters associated with the posed-body model by a frame-by-frame minimization of a third cost function, wherein
  the frame-by-frame minimization corresponds to the second shape-fitting, and the third cost function includes one or more of:
    a skin term to fit the posed-body model to a surface of a depth scan of the acquired set of depth scans,
    a first penalization term to penalize a first set of vertices of the obtained posed-body model which are fitted outside a clothed portion corresponding to the clothed scan points of the depth scan,
    a fit term that reduces a distance between a second set of vertices of the posed-body model and corresponding points of the depth scan, where the second set of vertices are fitted inside the clothed portion corresponding to the clothed scan points of the depth scan,
    a third face term that measures a distance between a set of facial features in one or more color images of the person and a set of facial landmarks of the human body prior, and
    a second penalization term to penalize a set of vertices of the obtained posed-body model fitted outside a foreground mask obtained from the depth scan.

12. The electronic device according to claim 1, wherein the circuitry is further configured to generate the final body model based on updated shape parameters and pose parameters associated with the posed-body model.

13. The electronic device according to claim 1, wherein the generated skin texture map includes a first skin texture for an unclothed skin region of the generated final body model and a second skin texture for an under-cloth skin region of the generated final body model.

14. The electronic device according to claim 1, wherein the circuitry is further configured to refine the final body model based on a fit of the final body model to variables of a shape refinement cost function, wherein the refined final body model is textured based on the skin texture map.

15. A method, comprising:
  in an electronic device:
    acquiring a set of depth scans of a person wearing clothes;
    generating an initial body model of the person based on a first shape-fitting of a human body prior with at least a first depth scan of the acquired set of depth scans;
    obtaining a posed-body model based on a pose-fitting of the generated initial body model with at least one depth scan of the acquired set of depth scans;
    determining, in each of the acquired set of depth scans, clothed scan points and unclothed scan points;
    generating a final body model of the person based on a second shape-fitting of vertices which belong to the posed-body model and correspond to an under-cloth skin portion of a body of the person,
      wherein the second shape-fitting is based on the determined clothed scan points and the determined unclothed scan points;
    generating an initial texture map based on a mapping of skin pixels in one or more color images of the person to a coordinate map, wherein the generated initial texture map comprises:
      one or more first regions which exclude a first texture of the under-cloth skin portion of the body in the one or more color images, and
      a second region which is filled with a second texture of an unclothed skin portion of the body in the one or more color images;
    applying a lighting correction to the generated initial texture map based on spherical harmonics;
    filling the one or more first regions of the generated initial texture map with a color-tuned skin texture, based on the application of the lighting correction;
    generating a skin texture map based on a map blending of the filled one or more first regions and the second region; and
    texturing the generated final body model based on the generated skin texture map for the body of the person.

16. The method according to claim 15, wherein the unclothed scan points correspond to one or more body parts, of which at least a portion of skin remains uncovered by the clothes.

17. The method according to claim 15, wherein the clothes correspond to a first type of body-fitting, which implies that a measurement of the clothes is greater than a corresponding measurement of the body by a first threshold.

18. A non-transitory computer-readable medium having stored thereon, computer-executable instructions that when executed by an electronic device, causes the electronic device to execute operations, the operations comprising:

acquiring a set of depth scans of a person wearing clothes;

generating an initial body model of the person based on a first shape-fitting of a human body prior with at least a first depth scan of the acquired set of depth scans;

obtaining a posed-body model based on a pose-fitting of the generated initial body model with at least one depth scan of the acquired set of depth scans;

determining, in each of the acquired set of depth scans, clothed scan points and unclothed scan points;

generating a final body model of the person based on a second shape-fitting of vertices which belong to the posed-body model and correspond to an under-cloth skin portion of a body of the person, wherein the second shape-fitting is based on the determined clothed scan points and the determined unclothed scan points;

generating an initial texture map based on a mapping of skin pixels in one or more color images of the person to a coordinate map, wherein the generated initial texture map comprises:

one or more first regions which exclude a first texture of the under-cloth skin portion of the body in the one or more color images, and a second region which is filled with a second texture of an unclothed skin portion of the body in the one or more color images;

applying a lighting correction to the generated initial texture map based on spherical harmonics;

filling the one or more first regions of the generated initial texture map with a color-tuned skin texture, based on the application of the lighting correction;

generating a skin texture map based on a map blending of the filled one or more first regions and the second region; and texturing the generated final body model based on the generated skin texture map for the body of the person.

* * * * *